United States Patent
Hayashi et al.

(10) Patent No.: US 6,380,647 B2
(45) Date of Patent: Apr. 30, 2002

(54) MOTOR HAVING ROTOR EQUIPPED WITH COOLING FAN

(75) Inventors: Yoshiaki Hayashi, Hamamatsu; Toshio Yamamoto, Kosai, both of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/793,531

(22) Filed: Feb. 27, 2001

(30) Foreign Application Priority Data

Mar. 24, 2000 (JP) ........................................ 2000-083914

(51) Int. Cl.[7] .............................. H02K 9/00; H02K 9/06
(52) U.S. Cl. ........................................... 310/51; 310/58
(58) Field of Search .................... 310/58, 59, 60 R, 310/61, 62, 63, 60 A, 51

(56) References Cited

U.S. PATENT DOCUMENTS 5,396,137 A * 3/1995 Shinto et al. .......... 310/156.44
5,763,968 A * 6/1998 Hayashi et al. ................ 310/51

FOREIGN PATENT DOCUMENTS

JP 2000-166179 6/2000

* cited by examiner

Primary Examiner—Nestor Ramirez
Assistant Examiner—Dang Dinh Le
(74) Attorney, Agent, or Firm—Law Offices of David G. Posz

(57) ABSTRACT

A motor includes a rotatable shaft, a core secured to the rotatable shaft, a fan secured to the rotatable shaft, and a yoke containing the core and the fan. The core has a plurality of slots around which a coil is wound. The fan has a plurality of blades. The yoke has a plurality of vent holes that communicate an interior of the yoke with an exterior of the yoke. The plurality of the vent holes are arranged adjacent the fan. The number of slots, the number of blades and the number of vent holes are set such that these three numbers do not share a common divisor other than 1.

20 Claims, 5 Drawing Sheets

VERTICAL AXIS:
    VIBRATION LEVEL
HORIZONTAL AXIS:
    FREQUENCY (Hz)

VERTICAL AXIS:
  VIBRATION LEVEL
HORIZONTAL AXIS:
  FREQUENCY (Hz)

MOTOR HAVING ROTOR EQUIPPED WITH COOLING FAN

CROSS REFERENCE TO RELATED APPLICATION

This application is based on and incorporates herein by reference Japanese Patent Application No. 2000-83914 filed on Mar. 24, 2000.

BACKGROUND OF THE INVENTION

1. Field of the Invention

The present invention relates to a motor having a rotor equipped with a cooling fan.

2. Description of Related Art one previously proposed rotor of a motor has a rotatable shaft to which an armature, a commutator and a cooling fan (hereinafter simply referred to as a fan) are secured. The rotor is substantially contained in a yoke. The yoke has a plurality of vent holes that communicate an interior of the yoke with an exterior of the yoke. These vent holes are disposed adjacent the fan. When the rotor rotates, the fan is rotated integrally with the rotor to circulate the air for cooling an interior of the motor.

In one type of such a motor, the number of slots formed in a core of the armature, the number of blades of the fan and the number of vent holes are set to twelve, six and eighteen, respectively. In such a motor, vibrations are generated as shown in FIG. 8.

More specifically, due to the fact that the number of slots is twelve, vibrations generated during movement of the slots across a magnetic field (for instance, a magnetic field generated adjacent magnets that are secured to the yoke) show peaks at 12 Hz (primary vibration), 24 Hz, 36 Hz, and so on. Furthermore, due to the fact that the number of blades is six, vibrations generated on the blade side during movement of the blades over the adjacent vent holes show peaks at 6 Hz, 12 Hz, 18 Hz, 24 Hz, 30 Hz, 36 Hz, and so on. Also, due to the fact that the number of vent holes is eighteen, the vibrations generated on the vent hole side during the movement of the blades over the adjacent vent holes show peaks at 18 Hz, 36 Hz, and so on.

All of these vibrations (i.e., vibrations generated at the slots, the blades and the vent holes) are added together (i.e., resonate together) in the motor at 36 Hz, 72 Hz, and so on, generating particularly large vibrations at these frequencies. As the number of these resonance frequencies at which all of the vibrations are added together (i.e., resonate together) increases within a predetermined frequency range (audible frequency range of generally between 16 Hz and 20 KHz), a noise level of the motor disadvantageously increases.

SUMMARY OF THE INVENTION

Thus, it is an objective of the present invention to reduce a noise level of a motor that has a rotor equipped with a cooling fan.

To achieve the objective of the present invention, there is provided a motor including a rotatable shaft, a core secured to the rotatable shaft, a fan secured to the rotatable shaft, and a yoke containing the core and the fan. The core has a plurality of slots around which a coil is wound. The fan has a plurality of blades. The yoke has a plurality of vent holes that communicate an interior of the yoke with an exterior of the yoke. The plurality of the vent holes are arranged adjacent the fan. The number of slots, the number of blades and the number of vent holes can be set such that the number of slots, the number of blades and the number of vent holes do not share a common divisor other than 1. Instead of setting all of the three numbers in the above manner, only the number of slots and the number of vent holes can be set such that the number of slots and the number of vent holes do not share a common divisor other than 1. Furthermore, only the number of blades and the number of vent holes can be set such that the number of blades and the number of vent holes do not share a common divisor other than 1.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to accompanying drawings.

Figure 1:
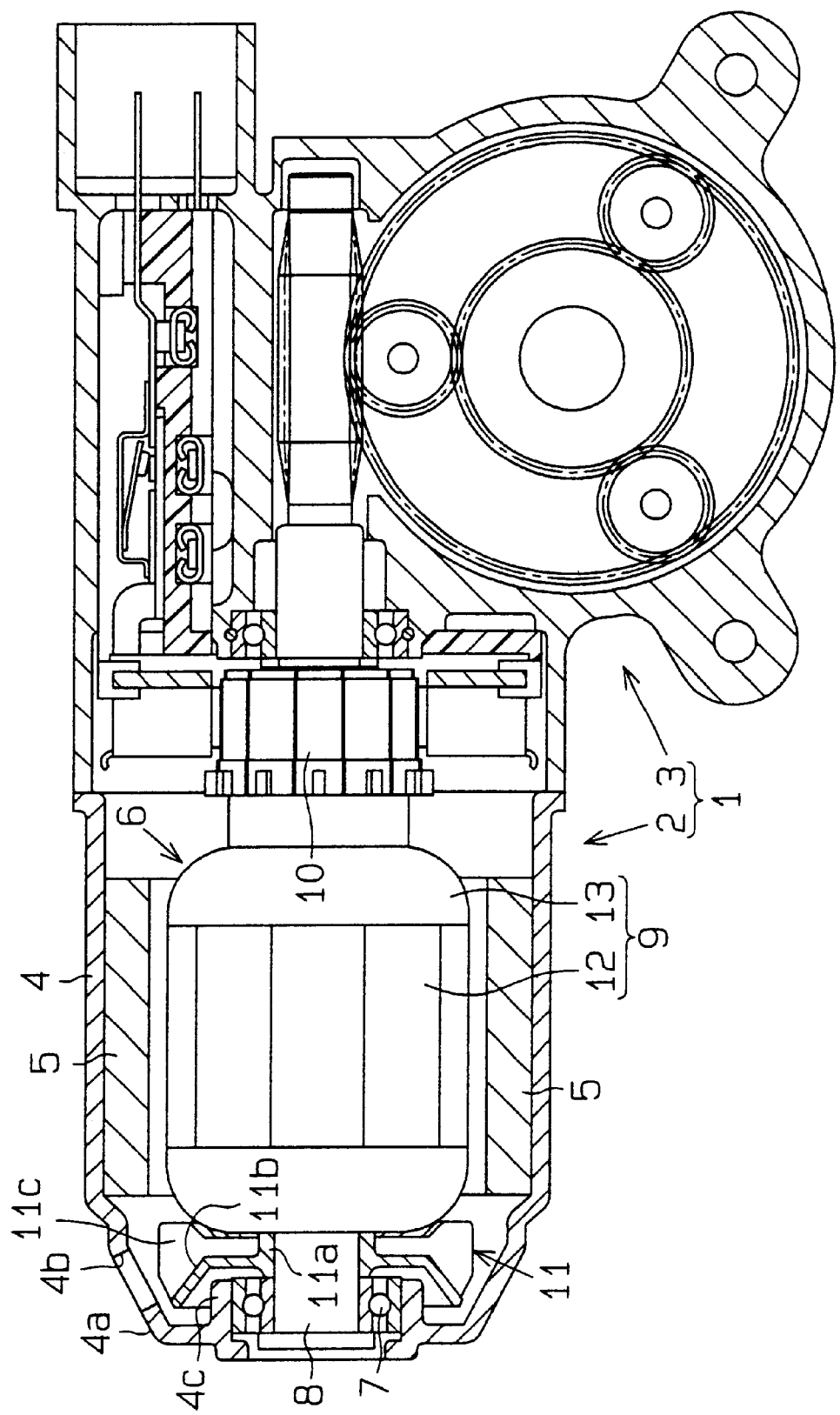
FIG. 1 is a schematic cross-sectional view of a motor according to one embodiment of the present invention.
Figure 4:
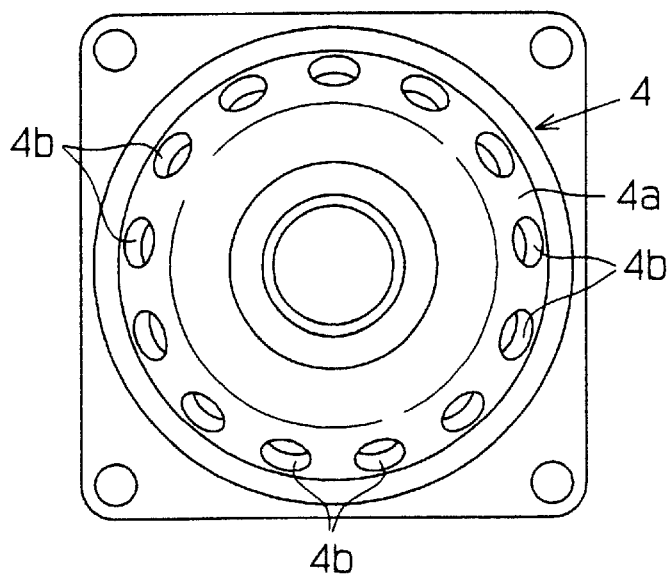
FIG. 4 is a schematic view of a yoke of the motor shown in FIG. 1.

As shown in FIG. 1, a motor 1 includes a motor main body 2 and a speed reducing unit 3 secured to the motor main body 2. The motor main body 2 includes a yoke housing (hereinafter simply referred to as a yoke) 4, a plurality of magnets 5 secured to an inner peripheral surface of the yoke 4, and a rotor 6 substantially contained within the yoke 4. The yoke 4 has a generally cylindrical body including a bottom wall (left side in FIG. 1) and an open end (right side in FIG. 1). At the bottom side of the yoke 4, there is provided a reduced diameter portion 4a that is tapered toward its end. A plurality (in FIG. 1, only one is indicated) of vent holes 4b are circumferentially arranged at substantially equal angular intervals in the reduced diameter portion 4a to communicate an interior of the yoke 4 with an exterior of the yoke 4. The vent holes 4b are all of substantially the same size and shape. In the present embodiment, as shown in FIG. 4, thirteen vent holes 4b are provided. At a center of the bottom wall of the yoke 4, there is formed a cylindrical flange 4c that protrudes toward the interior of the yoke 4. The cylindrical flange 4c receives and holds a bearing 7.

Figure 2:
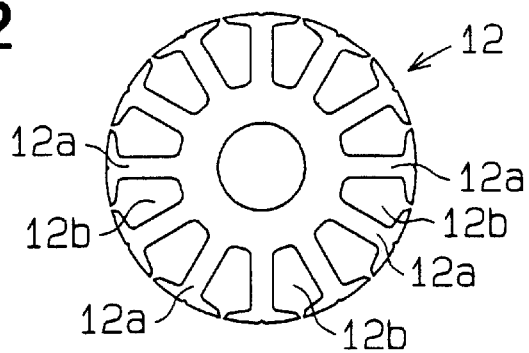
FIG. 2 is a schematic view of a core of the motor shown in FIG. 1.

The rotor 6 includes a rotatable shaft 8, an armature 9, a commutator 10 and a cooling fan (hereinafter simply referred to as a fan) 11. A base end of the rotatable shaft 8 is rotatably supported by the bearing 7. The armature 9 includes a core 12 and a coil (winding) 13 wound around the core 12. The armature 9 is secured to the middle of the rotatable shaft 8 such that the armature 9 faces the magnets 5. The core 12 has a plurality of slots 12b circumferentially arranged between teeth 12a at substantially equal angular intervals. The slots 12a are all of substantially the same size and shape. In the present embodiment, as shown in FIG. 2, twelve slots 12b are provided. The commutator 10 is secured to a distal end portion (distal to the armature 9) of the rotatable shaft 8. Adjacent to the vent holes 4b of the yoke 4, the fan 11 is secured to the base end portion of the rotatable shaft 8 between the bearing 7 and the armature 9.

Figure 3:
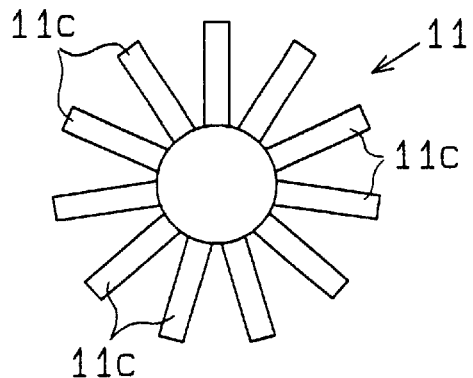
FIG. 3 is a schematic view of a fan of the motor shown in FIG. 1.

The fan 11 is made of a resin material and includes a cylindrical portion 11a received and secured around the rotatable shaft 8, an annular portion 11b generally radially outwardly extending from the cylindrical portion 11a, and a plurality of blades 11c axially protruding (toward the right side of FIG. 1) from the annular portion 11b. The blades 11c are circumferentially arranged about the shaft 8 at substantially equal angular intervals. The blades 11c are all of substantially the same size and shape. In the present embodiment, as shown in FIG. 3, eleven blades 11c are provided. That is, in the motor 1, the number (twelve in this embodiment) of slots 12b, the number (eleven in this embodiment) of blades 11c and the number (thirteen in this embodiment) of vent holes 4b are set such that these three numbers do not share a common divisor other than 1.

In the thus constructed motor 1, when the rotor 6 rotates, the fan 11 is rotated to circulate the air for cooling an interior of the motor 1.

The described embodiment provides the following characteristic advantages.

Figure 5:
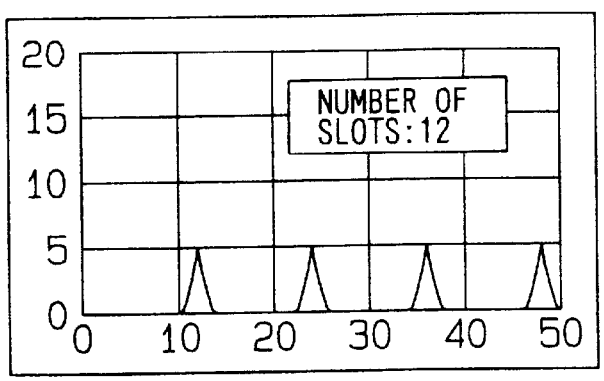
FIG. 5 is a characteristic diagram showing relationships between vibration levels and frequencies in the motor according to the embodiment of the present invention.
Figure 5:
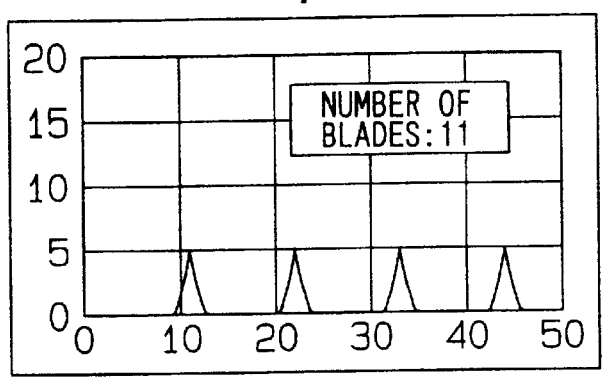
Figure 5:
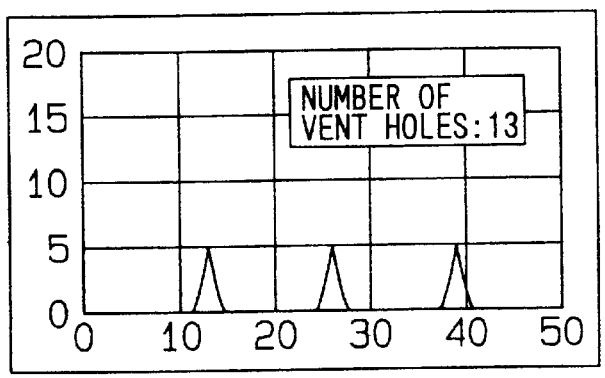
Figure 5:
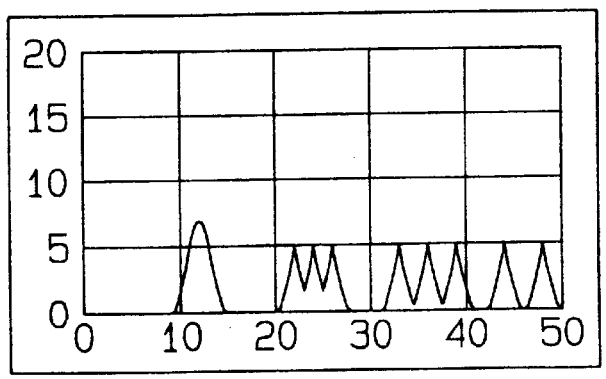

(1) While the motor 1 is operated, vibrations are generated as shown in FIG. 5. More specifically, due to the fact that the number of slots 12b is twelve, vibrations generated during the movement of the slots 12b (teeth 12a) across the magnetic field (adjacent the magnets 5) show peaks at 12 Hz, 24 Hz, 36 Hz, 48 Hz and so on. Furthermore, due to the fact that the number of blades 11c is eleven, vibrations generated on the blade 11c side (fan 11) during the movement of the blades 11c over the adjacent vent holes 4b show peaks at 11 Hz, 22 Hz, 33 Hz, 44 Hz, and so on. Also, due to the fact that the number of vent holes 4b is thirteen, the vibrations generated on the vent hole 4b side (yoke 4) during the movement of the blades 11c over the adjacent vent holes 4b show peaks at 13 Hz, 26 Hz, 39 Hz, and so on.

Figure 8:
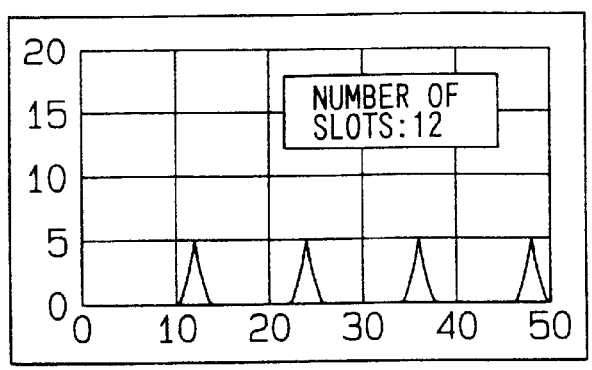
FIG. 8 is a characteristic diagram showing relationships between vibration levels and frequencies in a previously proposed motor.
Figure 8:
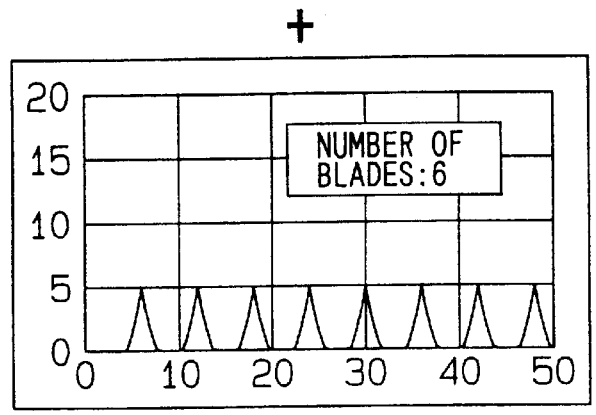
Figure 8:
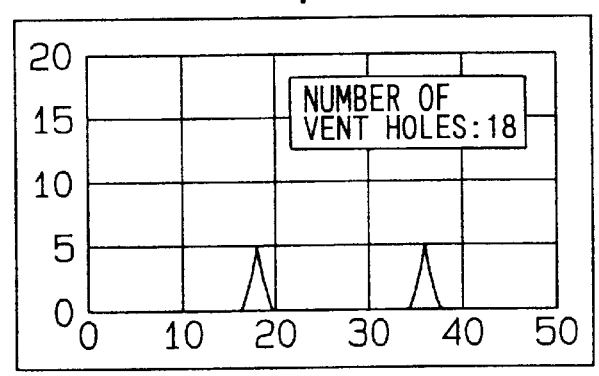
Figure 8:
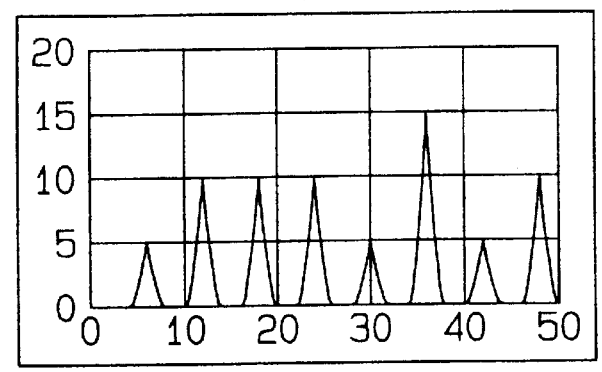

Due to the fact that the number (twelve) of slots 12b, the number (eleven) of blades 11c, and the number (thirteen) of vent holes 4b are set such that these three numbers do not share a common divisor other than 1, all of these vibrations are added together (i.e., resonate together) in the motor only at every 1,716 (=11×12×13) Hz. FIG. 5 is a characteristic diagram that only shows the frequencies up to 50 Hz, so that none of the resonance frequencies at which all of the vibrations are added together (i.e., resonate together) is shown in FIG. 5. Contrary to this, in the previously proposed motor, all of the vibrations are added together (i.e., resonate together) at every 36 Hz, as shown in FIG. 8.

According to the present embodiment, the number of resonance frequencies at which the vibrations generated at the slots 12b, the vibrations generated at the blades 11c and the vibrations generated at the vent holes 4b are added together (i.e., resonate together) is thus reduced within the predetermined frequency range (audible frequency range of generally between 16 Hz and 20 KHz). This results in a reduced noise level of the motor.

The above embodiment can be modified as follows.

Figure 6:
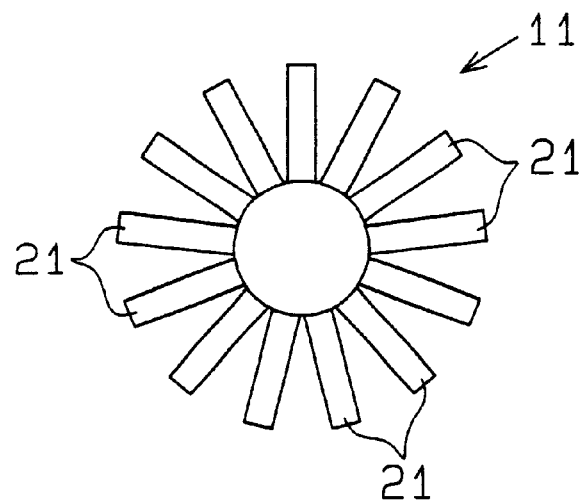
FIG. 6 is a schematic view showing a modification of the cooling fan shown in FIG. 3.
Figure 7:
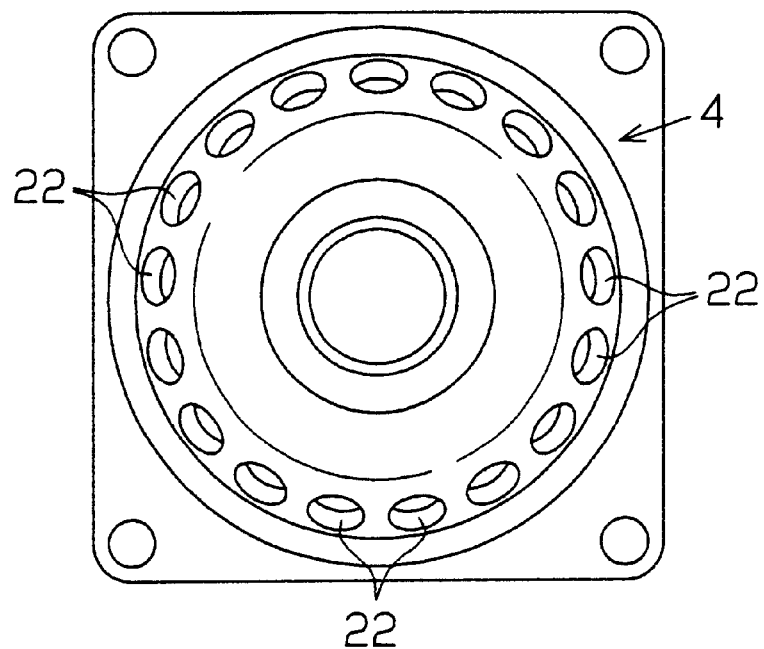
FIG. 7 is a schematic view showing a modification of the yoke shown in FIG. 4.

In the above embodiment, the number of slots 12b, the number of blades 11c and the number of vent holes 4b are set to twelve, eleven and thirteen, respectively. However, these numbers can be changed to any numbers as long as they do not share a common divisor other than 1. For instance, these numbers can be modified as follows. That is, the number of slots 12 can be twelve like that of the above embodiment. The number of blades 21 can be thirteen as shown in FIG. 6. Finally, the number of vent holes 22 can be seventeen as shown in FIG. 7. In the motor having such an arrangement, all of the vibrations are added together (resonate together) only at every 2,652 (=12×13×17) Hz. Thus, within the predetermined frequency range, there is the reduced number of resonance frequencies at which the vibrations generated at the slots 12b, the vibrations generated at the blades 21 and the vibrations generated at the vent holes 22 are added together (resonate together). This results in a reduced noise level of the motor.

Although the number of slots 12b, the number of blades 11c and the number of vent holes 4b are set such that these three numbers do not share a common divisor other than 1 in the above embodiment, this arrangement can be modified as follows. That is, only the number of slots and the number of blades can be set such that these two numbers do not share a common divisor other than 1, and the number of vent holes can be any number. In such a case, it is possible to vary the position, size and/or shape of each vent hole, as desired. For instance, the vent holes may be randomly arranged in the yoke. Even with such an arrangement, there is the reduced number of resonance frequencies at which the vibrations generated at the slots and the vibrations generated at the blades are added together (i.e., resonate together) within the predetermined frequency range. This results in a reduced noise level of the motor (rotor).

Likewise, only the number of slots and the number of vent holes can be set such that these two numbers do not share a common divisor other than 1, and the number of blades can be any number. Even with such an arrangement, there is the reduced number of resonance frequencies at which the vibrations generated at the slots and the vibrations generated at the vent holes are added together (i.e., resonate together) within the predetermined frequency range. This results in a reduced noise level of the motor (rotor).

Similarly, only the number of blades and the number of vent holes can be set such that these two numbers do not share a common divisor other than 1, and the number of slots can be any number. Even with such an arrangement, there is the reduced number of resonance frequencies at which the vibrations generated at the blades and the vibrations generated at the vent holes are added together (i.e., resonate together) within the predetermined frequency range. This results in a reduced noise level of the motor (rotor).

Additional advantages and modifications will readily occur to those skilled in the art. The invention in its broader terms is therefore, not limited to the specific details, representative apparatus, and illustrative examples shown and described. Changes may be made in detail, especially in matters of shape, size and arrangement of parts within the principles of the invention to the full extent indicated by the broad general meaning of the terms in which the appended claims are expressed. For instance, although the circular vent holes are disclosed in the accompanying drawings, the vent holes may have any geometrical shapes, such as elongated shapes, triangular shapes, fan shapes, oblong shapes, rectangular shapes or the like.

What is claimed is:

1. A motor comprising:

a rotatable shaft;

a core secured to said rotatable shaft, said core having a plurality of slots around which a coil is wound;

a fan secured to said rotatable shaft, said fan having a plurality of blades; and a yoke containing said core and said fan, said yoke having a plurality of vent holes that communicate an interior of said yoke with an exterior of said yoke, said plurality of said vent holes being arranged adjacent said fan, wherein:

a number of said slots, a number of said blades and a number of said vent holes are set such that said number of said slots, said number of said blades and said number of said vent holes do not share a common divisor other than 1.

2. A motor according to claim 1, wherein:

said number of said slots is twelve;

said number of said blades is eleven; and said number of said vent holes is thirteen.

3. A motor according to claim 2, wherein:

said plurality of slots of said core are circumferentially arranged into said core at substantially equal angular intervals;

said plurality of said fan are circumferentially arranged about said rotatable shaft at substantially equal angular intervals; and said plurality of vent holes of said yoke are circumferentially arranged in said yoke at substantially equal angular intervals.

4. A motor according to claim 3, wherein:

said plurality of slots of said core are all of substantially the same size and shape;

said plurality of blades of said fan are all of substantially the same size and shape; and said plurality of vent holes of said yoke are all of substantially the same size and shape.

5. A motor according to claim 2, wherein:

said plurality of slots of said core are all of substantially the same size and shape;

said plurality of blades of said fan are all of substantially the same size and shape; and said plurality of vent holes of said yoke are all of substantially the same size and shape.

6. A motor according to claim 1, wherein:

said number of said slot is twelve;

said number of said blades is thirteen; and said number of said vent holes is seventeen.

7. A motor according to claim 6, wherein:

said plurality of slots of said core are circumferentially arranged into said core at substantially equal angular intervals;

said plurality of blades of said fan are circumferentially arranged about said rotatable shaft at substantially equal angular intervals; and said plurality of vent holes of said yoke are circumferentially arranged in said yoke at substantially equal angular intervals.

8. A motor according to claim 7, wherein:

said plurality of slots of said core are core are all of substantially the same size and shape;

said plurality of blades of said fan are all of substantially the same size and shape; and said plurality of vent holes of said yoke are all of substantially the same size and shape.

9. A motor according to claim 6, wherein:

said plurality of slots of said core are all of substantially the same size and shape;

said plurality of blades of said fan are all of substantially the same size and shape; and said plurality of vent holes of said yoke are all of substantially the same size and shape.

10. A motor according to claim 1, wherein:

said plurality of slots of said core are circumferentially arranged into said core at substantially equal angular intervals;

said plurality of blades of said fan are circumferentially arranged about said rotatable shaft at substantially equal angular intervals; and said plurality of vent holes of said yoke are circumferentially arranged in said yoke at substantially equal angular intervals.

11. A motor according to claim 10, wherein:

said plurality of slots of said core are all of substantially the same size and shape;

said plurality of blades of said fan are all of substantially the same size and shape; and said plurality of vent holes of said yoke are all of substantially the same size and shape.

12. A motor according to claim 1, wherein:

said plurality of slots of said core are all of substantially the same size and shape;

said plurality of blades of said fan are all of substantially the same size and shape; and said plurality of vent holes of said yoke are all of substantially the same size and shape.

13. A motor comprising:

a rotatable shaft;

a core secured to said rotatable shaft, said core having said plurality of slots around which a coil is wound;

a fan secured to said rotatable shaft, said fan having a plurality of blades; and a yoke containing said and core and said fan, said yoke having aplurality of vent holes that communicate an interior of said yoke with an exterior of said yoke, and plurality of said vent holes being arranged adjacent said fan, wherein;

a number of said slots and a number of said vent holes are set such that said number of said slots and said number of said vent holes do not share a common divisor other than 1.

14. A motor according to claim 13, wherein:

said plurality of slots of said core are circumferentially arranged into said core at substantially equal angular intervals;

said plurality of blades of said fan are circumferentially arranged about said rotatable shaft at substantially equal angular intervals; and said plurality of vent holes of said yoke are circumferentially arranged in said yoke at substantially equal angular intervals.

15. A motor according to claim 14, wherein:

said plurality of slots of said core are all of substantially the same size and shape;

said plurality of blades of said fan are all of substantially the same size and shape; and said plurality of vent holes of said yoke are all of substantially the same size and shape.

16. A motor according to claim 13, wherein:

said plurality of slots of said core are all of substantially the same size and shape;

said plurality of blades of said fan are all of substantially the same size and shape; and said plurality of vent holes of said yoke are all of substantially the same size and shape.

17. A motor comprising:

a rotatable shaft;

a core secured to said rotatable shaft, said core having a plurality of slots around which a coil is wound;

a fan secured to said rotatable shaft, said fan having a plurality of blades; and a yoke containing said core and said fan, said yoke having a plurality of vent holes that communicate an interior of said yoke with an exterior of said yoke, said plurality of said vent holes being arranged adjacent said fan, wherein:

a number of said blades and a number of said vent holes are set such that said number of said blades and said number of said vent holes do not share a common divisor other than 1.

18. A motor according to claim 17, wherein:

said plurality of slots of said core are circumferentially arranged into said core at substantially equal angular intervals;

said plurality of blades of said fan are circumferentially arranged about said rotatable shaft at substantially equal angular intervals; and said plurality of vent holes of said yoke are circumferentially arranged in said yoke at substantially equal angular intervals.

19. A motor according to claim 18, wherein:

said plurality of slots of said core are all of substantially the same size and shape;

said plurality of blades of said fan are all of substantially the same size and shape; and said plurality of vent holes of said yoke are all of substantially the same size and shape.

20. A motor according to claim 17, wherein:

said plurality of slots of said core are all of substantially the same size and shape;

said plurality of blades of said fan are all of substantially the same size and shape; and said plurality of vent holes of said yoke are all of substantially the same size and shape.

* * * * *